US012761352B2

(12) United States Patent
Wan et al.

(10) Patent No.: US 12,761,352 B2
(45) Date of Patent: Oct. 13, 2026

(54) ULTRASONIC RADAR SENSOR ASSEMBLY

(71) Applicant: VISION AUTOMOBILE ELECTRONICS INDUSTRIAL CO., LTD., Tainan City (TW)

(72) Inventors: Tien-Bou Wan, Tainan City (TW); Chung-Hsiao Lo, Tainan City (TW); Chien-Liang Pan, Tainan City (TW); An-Hun Cheng, Tainan City (TW); Chia-Hung Wu, Tainan City (TW)

(73) Assignee: VISION AUTOMOBILE ELECTRONICS INDUSTRIAL CO., LTD., Tainan City (TW)

( * ) Notice: Subject to any disclaimer, the term of this patent is extended or adjusted under 35 U.S.C. 154(b) by 341 days.

(21) Appl. No.: 18/613,887

(22) Filed: Mar. 22, 2024

(65) Prior Publication Data

US 2025/0172695 A1 May 29, 2025

(30) Foreign Application Priority Data

Nov. 29, 2023 (TW) ................................ 112146422

(51) Int. Cl.
*G01S 15/931* (2020.01)
*G01S 7/52* (2006.01)
(Continued)

(52) U.S. Cl.
CPC ........ *G01S 15/931* (2013.01); *G01S 7/52004* (2013.01); *G01S 7/521* (2013.01);
(Continued)

(58) Field of Classification Search
None
See application file for complete search history.

(56) References Cited

U.S. PATENT DOCUMENTS 4,785,429 A * 11/1988 Folwell ................. G01S 15/931 367/909
5,229,975 A * 7/1993 Truesdell .............. G01S 15/931 367/99
(Continued)

FOREIGN PATENT DOCUMENTS

CN 203567648 U 4/2014
CN 109177911 A 1/2019
(Continued)

OTHER PUBLICATIONS

Taiwanese Search Report for Taiwanese Application No. 112146422, dated Oct. 22, 2024, with English translation.

*Primary Examiner* — Jonathan D Armstrong
(74) *Attorney, Agent, or Firm* — Birch, Stewart, Kolasch & Birch, LLP

(57) ABSTRACT

An ultrasonic radar sensor assembly installed on an automobile includes an ultrasonic radar sensor that emits an ultrasonic wave and obtains a response wave signal that indicates a plurality of detected distances, and a control unit. When operating in a learning mode, the control unit activates the ultrasonic radar sensor, receives the response wave signal, and determines a fixed distance range based on the response wave signal. When operating in a detecting mode, the control unit activates the ultrasonic radar sensor, receives the response wave signal, performs a filtering operation to filter out the detected distances that are within the fixed distance range, determines each of the detected distances not within the fixed distance range as an effective detected distance, and when that the effective detected distance is not larger than a predetermined distance threshold, generates and outputs an alert.

8 Claims, 7 Drawing Sheets

(51) Int. Cl.
*G01S 7/521* (2006.01)
*G01S 7/62* (2006.01)
*G01S 15/08* (2006.01)

(52) U.S. Cl.
CPC ............ *G01S 7/6281* (2013.01); *G01S 15/08* (2013.01); *G01S 2015/932* (2013.01); *G01S 2015/937* (2013.01)

(56) References Cited

U.S. PATENT DOCUMENTS

| | | | | |
|---|---|---|---|---|
| 6,337,625 | B1 * | 1/2002 | Taylor | G01S 13/04 340/552 |
| 7,728,719 | B2 * | 6/2010 | Li | G01S 15/87 340/435 |
| 10,769,904 | B2 * | 9/2020 | Wedig | G08B 7/066 |
| 10,936,902 | B1 * | 3/2021 | Bagwell | G06T 7/73 |
| 11,010,907 | B1 * | 5/2021 | Bagwell | G05D 1/0221 |
| 2005/0141997 | A1 * | 6/2005 | Rast | F41A 19/03 416/229 R |
| 2008/0218324 | A1 * | 9/2008 | Li | G01S 15/87 340/932.2 |
| 2014/0002239 | A1 * | 1/2014 | Rayner | G08B 13/2462 340/5.61 |
| 2015/0332532 | A1 * | 11/2015 | Lee | G07C 9/00658 340/5.72 |
| 2018/0047290 | A1 * | 2/2018 | Min | G08G 1/164 |
| 2019/0197430 | A1 * | 6/2019 | Arditi | G06N 20/00 |
| 2020/0193194 | A1 * | 6/2020 | Zhang | G06F 18/217 |
| 2021/0101639 | A1 * | 4/2021 | Chiu | B60W 50/14 |

FOREIGN PATENT DOCUMENTS

| | | | | |
|---|---|---|---|---|
| EP | 0023625 | A2 * | 2/1981 | G01S 13/18 |
| TW | 200817212 | A | 4/2008 | |
| WO | WO 2018/040854 | A1 | 3/2018 | |

* cited by examiner

ULTRASONIC RADAR SENSOR ASSEMBLY

CROSS-REFERENCE TO RELATED APPLICATION

This application claims priority to Taiwanese Invention Patent Application No. 112146422, filed on Nov. 29, 2023, and incorporated by reference herein in its entirety.

FIELD

The disclosure relates to a device for detecting obstacles, and more particularly to an ultrasonic radar sensor assembly for detecting obstacles.

BACKGROUND

Parking sensors are typically installed on automobiles, particularly large automobiles such as trucks, link trucks, trailer trucks, container trucks, etc., in order to alert the drivers of nearby obstacles in situations like parking the automobiles. Typically, parking sensors are implemented using proximity sensors that are configured to detect objects that are in proximity to the proximity sensors, and generate an alert signal in the form of, for example, a buzzing sound to inform the drivers.

It is noted that in some cases a large automobile may be equipped with one or more attached structures on a lower back part of a carriage of the automobile, such as a footrest, an anti-collision structure, etc. Since the parking sensors are typically also installed on the lower back part of the carriage, the attached structures may come into proximity to the parking sensors. As a result, the parking sensors may erroneously generate the alert signal continuously. It is not desirable to relocate the parking sensors to other locations either since moving the parking sensors away from the original locations may result in some areas in the proximity of the automobile being left unmonitored by any one of the parking sensors, and if the parking sensors were to be relocated, when obstacles appear in those areas, the driver would not be alerted since no alert signal is generated. As such, this may increase the risk of collision.

SUMMARY

Therefore, an object of the disclosure is to provide an ultrasonic radar sensor assembly that can alleviate at least one of the drawbacks of the prior art.

According to one embodiment of the disclosure, the ultrasonic radar sensor assembly is for detecting obstacles, and is installed on an automobile that includes an attached structure. the ultrasonic radar sensor assembly includes:

- an ultrasonic radar sensor that is disposed on a surface of the automobile, the ultrasonic radar sensor, when activated, being configured to emit an ultrasonic wave, and to obtain a response wave signal that results from a reflection of the ultrasonic wave by a nearby object and that indicates a plurality of detected distances; and
- a control unit that is connected to the ultrasonic radar sensor, and that includes a controller and an alert module, the controller being configured to operate in one of a learning mode and a detecting mode.

When operating in the learning mode, the controller activates the ultrasonic radar sensor, receives the response wave signal, and determines a fixed distance range based on the response wave signal.

When operating in the detecting mode, the controller activates the ultrasonic radar sensor, receives the response wave signal, performs a filtering operation to filter out the detected distances that are within the fixed distance range, determines each of the detected distances that are not within the fixed distance range as an effective detected distance, and in the case that the effective detected distance is not larger than a predetermined distance threshold, generates an alert and controls the alert module to output the alert.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
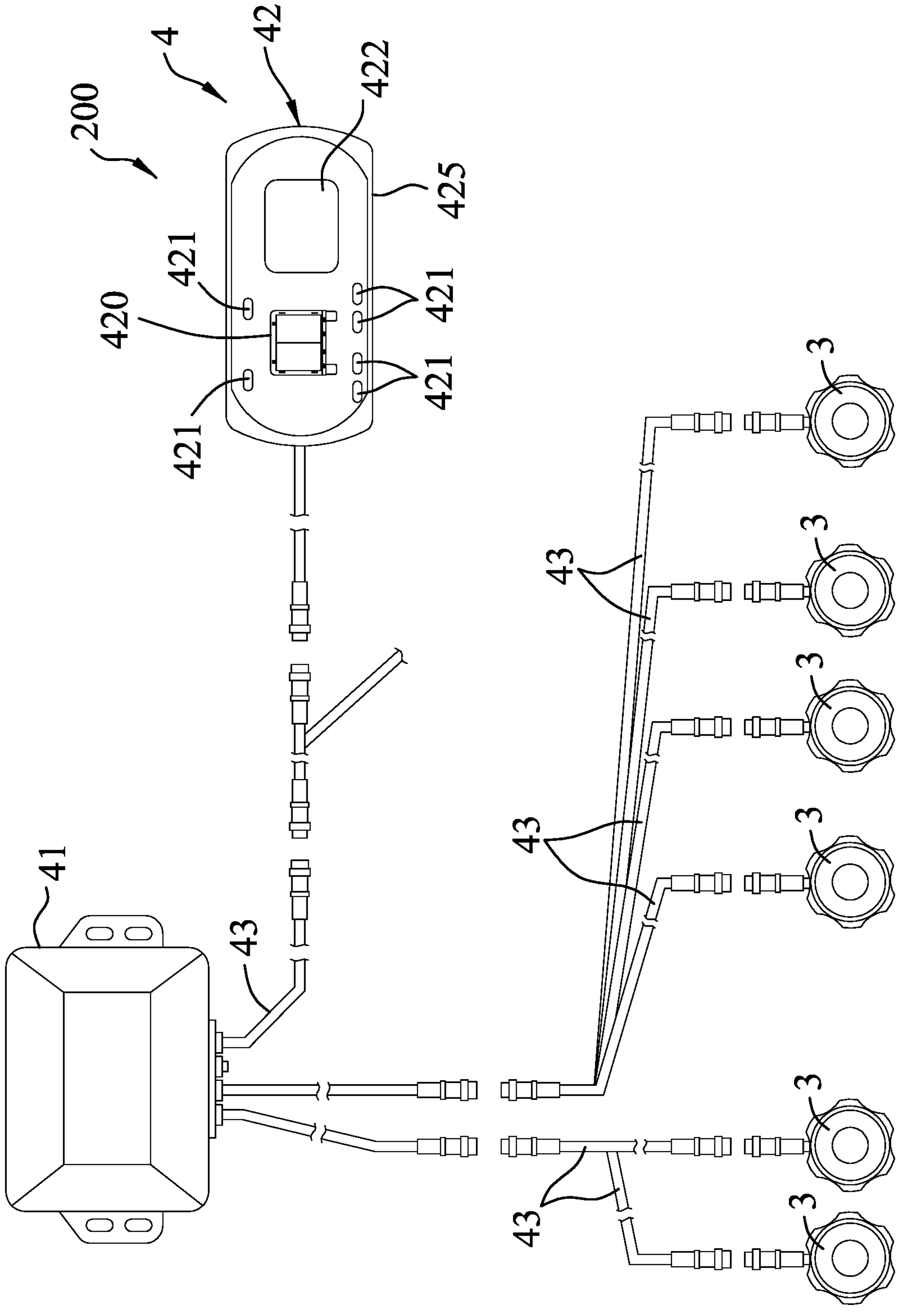
FIG. 1 illustrates an ultrasonic radar sensor assembly for detecting obstacles according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/ devices/equipment via another one or more apparatus/devices/equipment, or wireless communication.

Figure 2:
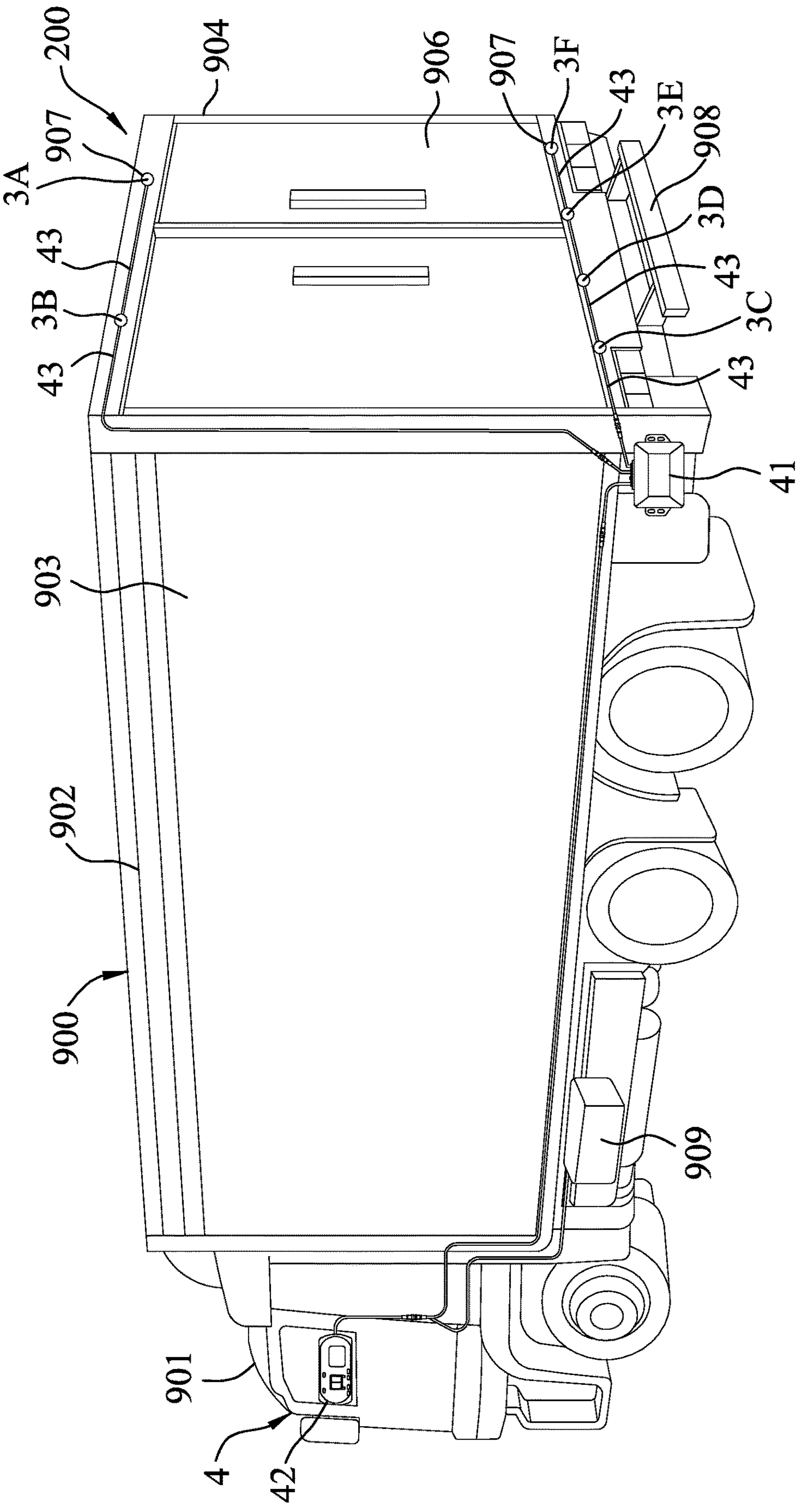
FIG. 2 illustrates the ultrasonic radar sensor assembly being installed on an exemplary automobile, which is a left-hand driving truck, according to one embodiment of the disclosure.

FIG. 1 illustrates an ultrasonic radar sensor assembly 200 for detecting obstacles according to one embodiment of the disclosure. In this embodiment, the ultrasonic radar sensor assembly 200 is used with a vehicle such as an automobile. FIG. 2 illustrates the ultrasonic radar sensor assembly 200 being installed on an exemplary automobile 900, which may be a left-hand drive (i.e., a driver's seat is on a left side) container truck, according to one embodiment of the disclosure.

The automobile 900 includes a truck chassis 901, a container 902 that is connected to the truck chassis 901, an attached structure 908 that is connected to a back of the container 902, and a power system 909 disposed on the truck chassis 901. The truck chassis 901 may include a cabin with a number of seats, and a chassis for placing the container 902 thereon. The container 902 has a first side wall 903, a second side wall 904 that is opposite to the first side wall 903, and a back wall 905 that defines a back surface 906 (which faces outwardly). The back surface 906 is formed with a plurality of through holes 907 that are spaced apart from one another. In the embodiment of FIG. 2, the through holes 907 are formed on a top part and a bottom part of the back surface 906, with two through holes 907 being formed on the top part of the back surface 906 and four through holes 907 being formed on the bottom part of the back surface 906.

The attached structure 908 is detachably attached to the bottom part of the back surface 906 and below the four through holes 907 formed on the bottom part of the back surface 906, and may be embodied using a rear step to enable an operator to step thereon or an anti-collision structure.

The ultrasonic radar sensor assembly 200 includes a plurality of ultrasonic radar sensors 3 and a control unit 4 that is connected to the plurality of ultrasonic radar sensors 3.

In some embodiments, each of the ultrasonic radar sensors 3 is installed on the back wall 905 through a respective one of the through holes 907. In the embodiment of FIG. 2, six ultrasonic radar sensors (labeled as 3A, 3B, 3C, 3D, 3E and 3F, respectively) are present, and are installed respectively through the six through holes 907. The control unit 4 and each of the ultrasonic radar sensors 3 are connected to the power system 909 for obtaining electricity for operation. Each of the ultrasonic radar sensors 3, when activated, is configured to emit an ultrasonic wave to cover a predetermined range of detection (typically in a shape of a circular sector) for detecting an object in proximity to the ultrasonic radar sensor 3. When the ultrasonic wave comes in contact with an object, the ultrasonic wave may be reflected by the object and travels back toward the ultrasonic radar sensor 3. It is noted that the operation of the ultrasonic radar sensors 3 are readily available in the related art, and details thereof are omitted herein for the sake of brevity.

Figure 3:
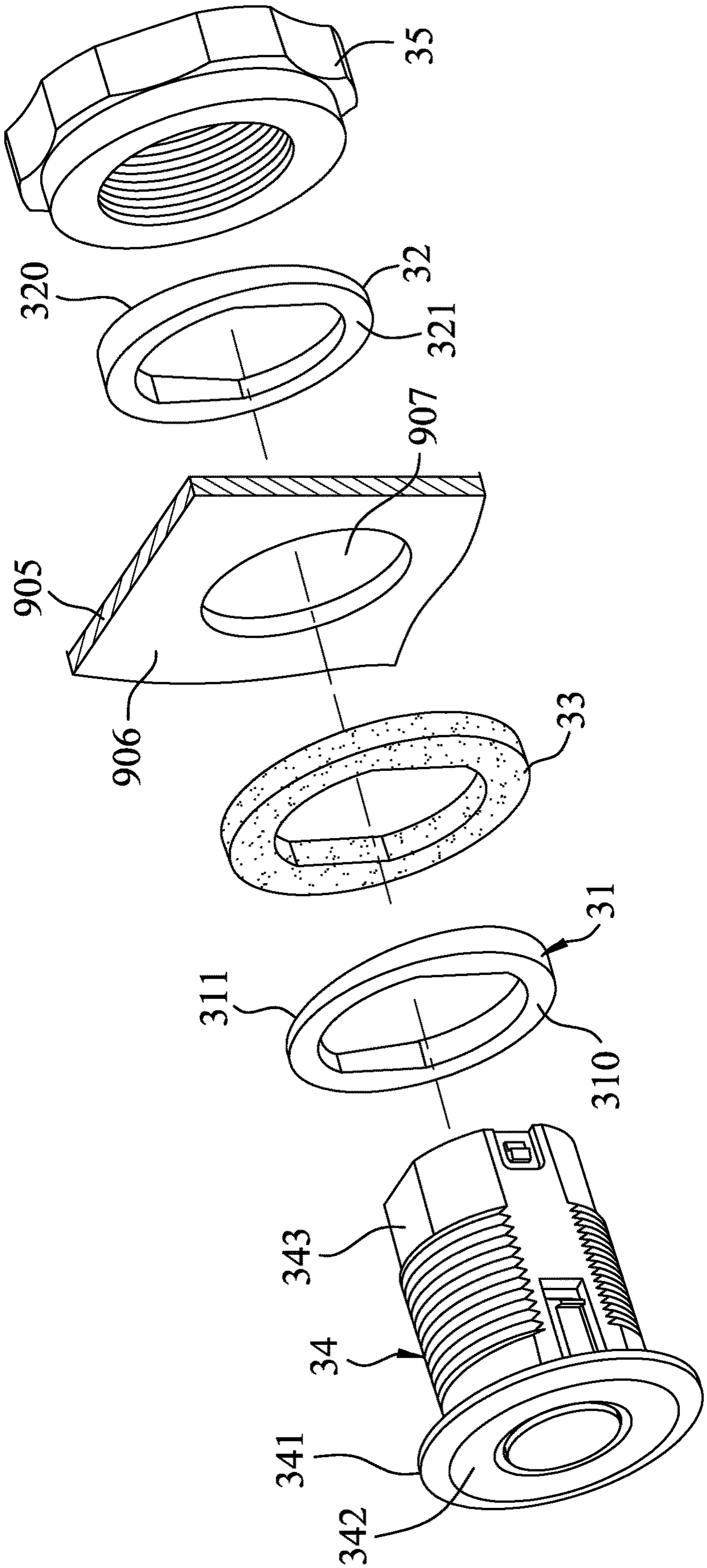
FIG. 3 is a partially exploded view illustrating one exemplary ultrasonic radar sensor being installed on the back wall through one of the through holes according to one embodiment of the disclosure.

FIG. 3 is a partially exploded view illustrating one exemplary ultrasonic radar sensor 3 being installed on the back wall 905 through one of the through holes 907 according to one embodiment of the disclosure. In some embodiments, the ultrasonic radar sensor 3 includes a first angled securing member 31, a second angled securing member 32, a gasket 33, a main body 34 and a securing nut 35. The main body 34 includes a sensor head portion 341 that defines a detecting surface 342, and a securing portion 343.

Figure 4:
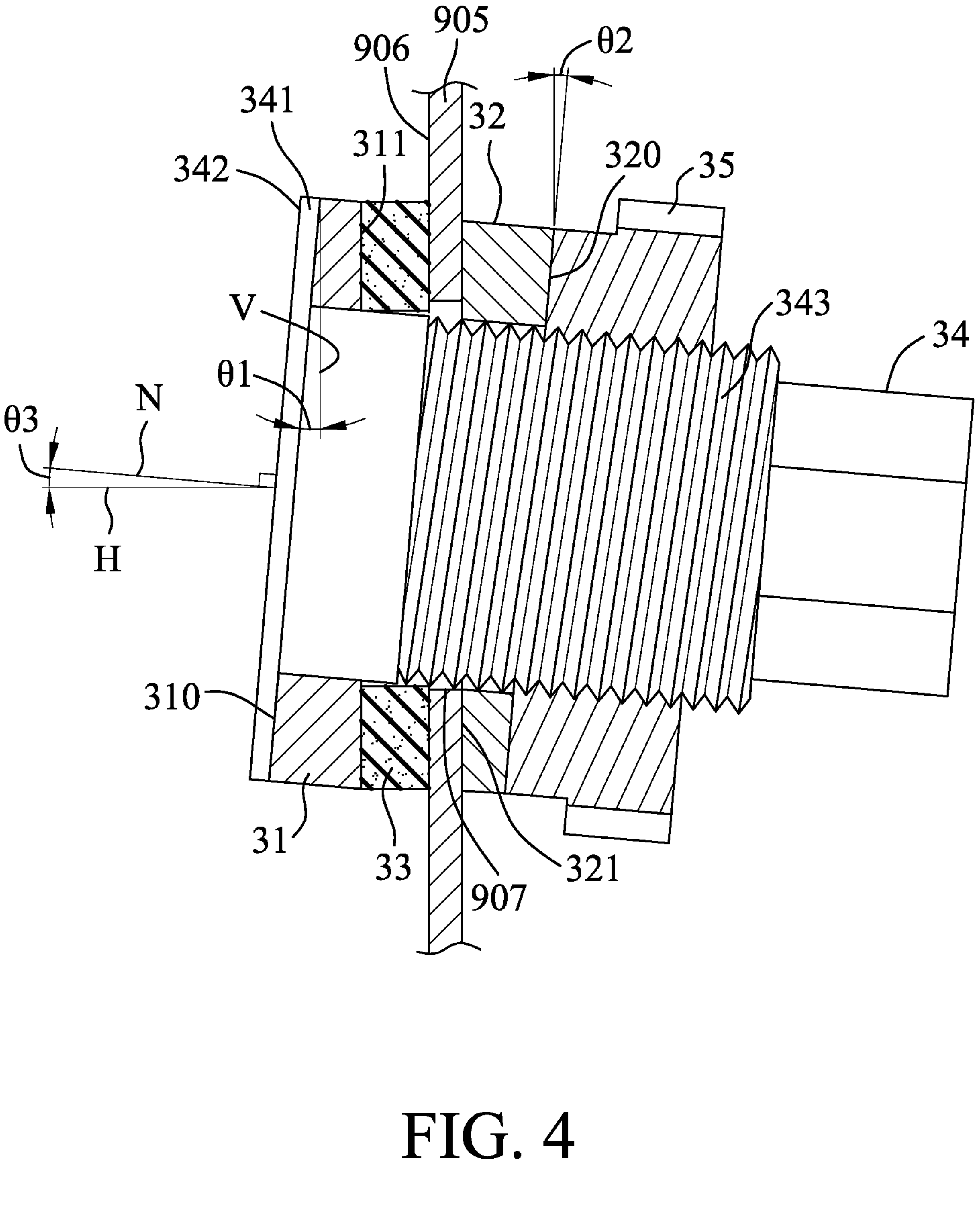
FIG. 4 is a sectional view illustrating the exemplary ultrasonic radar sensor being installed in the one of the through holes according to one embodiment of the disclosure.

FIG. 4 is a sectional view illustrating the exemplary ultrasonic radar sensor 3 installed in the one of the through holes 907 according to one embodiment of the disclosure. Specifically, the back wall 905 is disposed to be in a vertically standing position with respect to the ground (i.e., the back wall 905 and the ground define an angle of about 90 degrees).

In order to install the ultrasonic radar sensor 3 onto the back wall 905, the first angled securing member 31 and the gasket 33 are disposed on one side of the back wall 905 where the back surface 906 is located, and the second angled securing member 32 is disposed on an opposite side of the back wall 905. The gasket 33 and the second angled securing member 32 are disposed to contact the back wall 905 directly, and the first angled securing member 31 are disposed to contact the gasket 33. Each of the first angled securing member 31, the second angled securing member 32 and the gasket 33 is formed with a through hole that is in spatial communication with the through hole 907.

The first angled securing member 31 includes a first surface 310 and a second surface 311 that is opposite to the first surface 310 and that is disposed to contact the gasket 33. The first surface 310 is formed in a manner such that when the second surface 311 is in contact to the gasket 33 (which is in contact with the back surface 906 of the back wall 905), the first surface 310 defines a first angle $\theta_1$ with a vertical line (V) that is perpendicular to the ground. The second angled securing member 32 includes a first surface 320 and a second surface 321 that is opposite to the first surface 320 and that is disposed to contact the back wall 905. The first surface 320 is formed in a manner such that when the second surface 321 is in contact to back wall 905, the first surface 320 defines a second angle $\theta_2$ with the vertical line (V).

The securing portion 343 of the main body 34 is formed to be able to be moved through the first angled securing member 31, the gasket 33, the through hole 907 and the second angled securing member 32, and the sensor head portion 341 is formed to have a diameter larger than that of the through hole of the first angled securing member 31. As a result, after moving the securing portion 343 through the first angled securing member 31, the gasket 33, the through hole 907 and the second angled securing member 32, the sensor head portion 341 is moved to contact the first surface 310 of the first angled securing member 31. Afterward, the securing nut 35 is moved to sleeve the securing portion 343 and contacts the first surface 320 of the second angled securing member 32 so as to urge the sensor head portion 341 to abut against the first surface 310. In this embodiment, an inner surface of the securing nut 35 and the securing portion 343 are formed with screw threads such that the securing nut 35 is able to be firmly secured on the securing portion 343.

After the securing nut 35 is secured on the securing portion 343, the sensor head portion 341 may be placed in a position such that a normal line (N) of the detecting surface 342 defines a third angle $\theta_3$ with a horizontal line (H) that is perpendicular to the vertical line (V). The value of the third angle $\theta_3$ may be designed by adjusting the values of the first angle $\theta_1$ and the second angle $\theta_2$ (i.e., changing the shapes of the first surface 310 and the first surface 320), and may be about 5 to about 15 degrees. It is noted that while in this example the detecting surface 342 faces upwardly, for other ultrasonic radar sensors 3, the detecting surface 342 may be designed to face downwardly. It is noted that in the embodiment of FIG. 4, for the ultrasonic radar sensors 3, the angles are designed such that values of the first angle $\theta_1$ and the second angle $\theta_2$ are identical. In this manner, when the securing nut 35 is secured on the securing portion 343, the components of the ultrasonic radar sensors 3 (i.e., the first angled securing member 31, the gasket 33, the second angled securing member 32) and the back wall 905 can be disposed to tightly contact one another. As a result, the third angle $\theta_3$ may be identical to the first angle $\theta_1$ and the second angle $\theta_2$.

It is noted that while in the embodiment of FIGS. 2 and 3, each of the ultrasonic radar sensors 3 may be installed on the back wall 905 in a manner similar as those shown in FIGS. 2 and 3, in other embodiments, the ultrasonic radar sensors 3 may be installed on the back wall 905 in other manners.

The detecting surface 342 may be equipped with components that are configured to emit the ultrasonic wave in a direction along the normal line (N).

Figure 5:
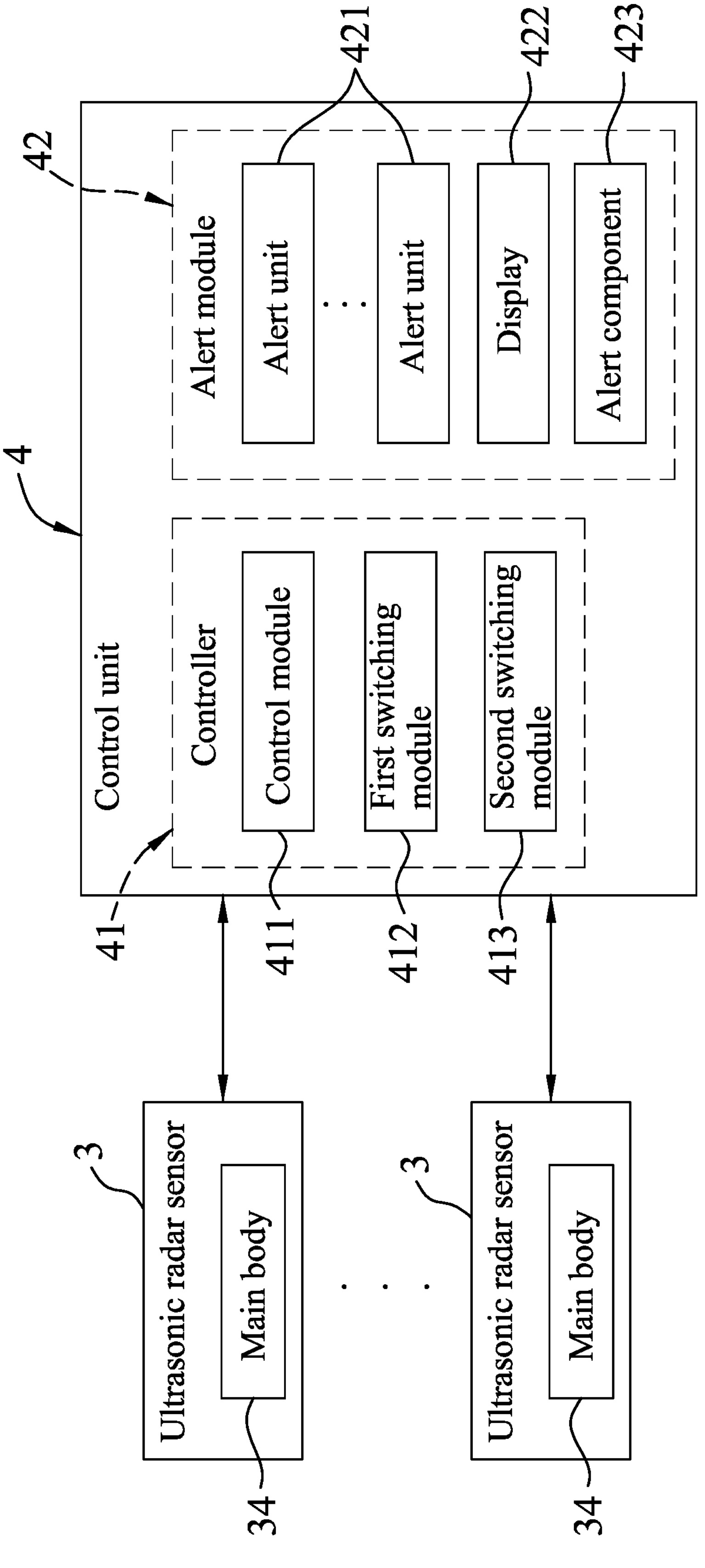
FIG. 5 is a block diagram illustrating the components of the control unit according to one embodiment of the disclosure.

FIG. 5 is a block diagram illustrating the components of the control unit 4 according to one embodiment of the disclosure. In this embodiment, the control unit 4 includes a controller 41, an alert module 42 and a plurality of wires 43 for connecting the controller 41 to the alert module 42, the power system 909 and the ultrasonic radar sensors 3.

In the embodiment of FIG. 2, the alert module 42 is disposed near a left side seat of the cabin, and the controller 41 is disposed on the first side wall 903. As such, one of the wires 43 may be arranged to extend across the first side wall 903 to connect to the alert module 42 and the power system 909, another one of the wires 43 may be arranged to extend along the first side wall 903 upwardly, and horizontally to the right across the back wall 905 to connect to the ultrasonic radar sensors 3A and 3B, and a third one of the wires 43 may be arranged to extend from the first side wall 903 horizontally to the right across the back wall 905 to connect to the ultrasonic radar sensors 3C, 3D, 3E and 3F. Such an arrangement of components of the ultrasonic radar sensor assembly 200 may be referred to as a first arrangement. It is noted that due to the arrangement, each of the wires 43 may have a different length.

Figure 6:
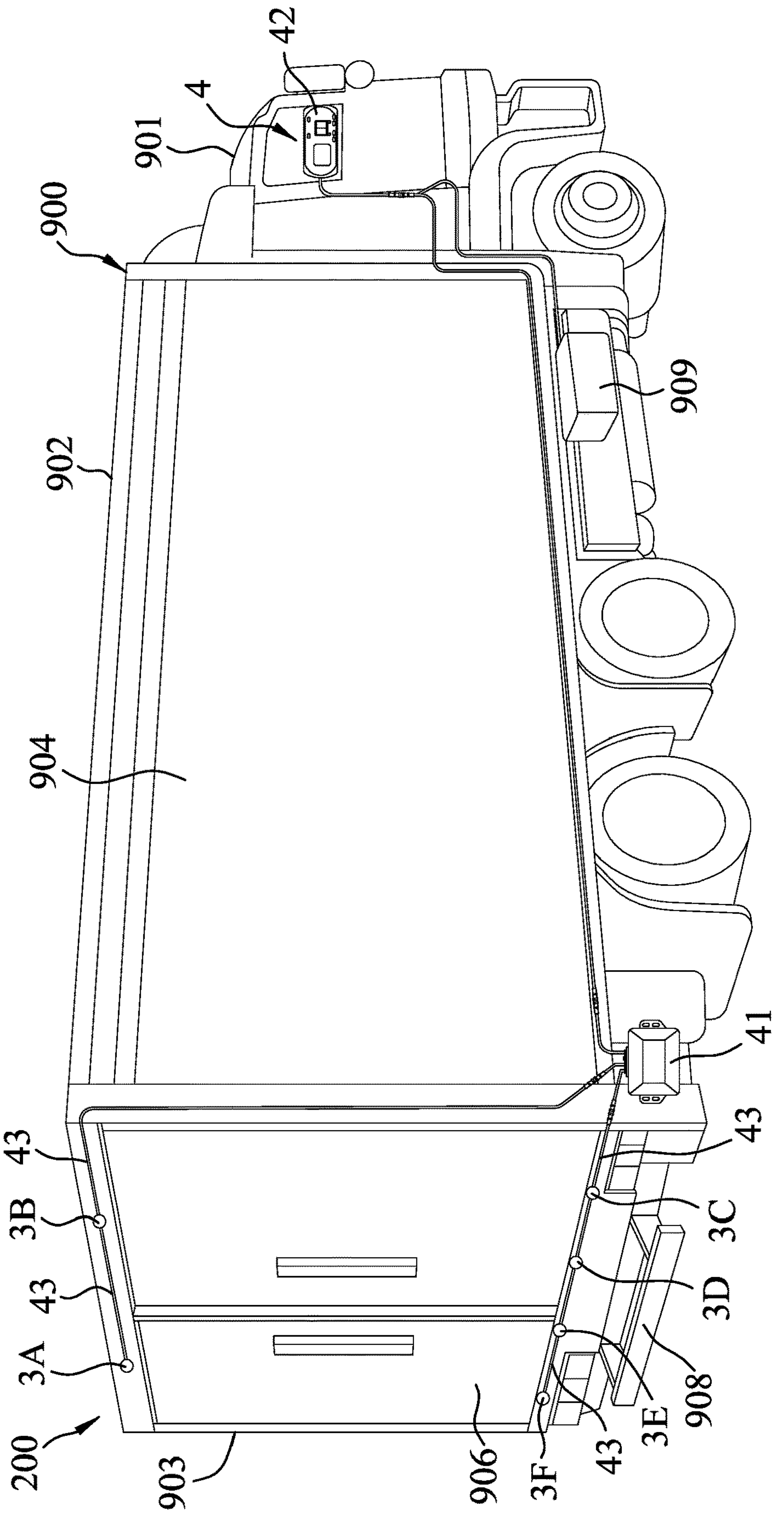
FIG. 6 illustrates the ultrasonic radar sensor assembly being installed on another exemplary automobile, which is a right-hand driving container truck, according to one embodiment of the disclosure.

On the other hand, FIG. 6 illustrates the ultrasonic radar sensor assembly 200 being installed on another exemplary automobile 900, which may be a right-hand drive container truck (i.e., a driver's seat is on a right side), according to one embodiment of the disclosure. In such a case, the alert module 42 is disposed near a right side seat of the cabin, the controller 41 is disposed on the second side wall 904, one of the wires 43 may be arranged to extend across the second side wall 904 to connect to the alert module 42 and the power system 909, another one of the wires 43 may be arranged to extend along the second side wall 904 upwardly, and horizontally to the left across the back wall 905 to connect to the ultrasonic radar sensors 3B and 3A, and a third one of the wires 43 may be arranged to extend from the second side wall 904 horizontally to the left across back wall 905 to connect to the ultrasonic radar sensors 3C, 3D, 3E and 3F. That is to say, in the embodiment of FIG. 6, the arrangement of components of the ultrasonic radar sensor assembly 200 may be referred to as a second arrangement, and is in a manner that has reflection symmetry with the first arrangement related to the ultrasonic radar sensor assembly 200 of the embodiment of FIG. 2. The controller 41 is not limited to being disposed on the container 902, and in some embodiments, the controller 41 may be disposed on the truck chassis 901.

The controller 41 includes a control module 411, a first switching module 412 and a second switching module 413. The control module 411 may include, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

In use, the control module 411 may include pre-programmed microprocessor that is configured to operate in one of a number of different operation modes. The operation modes may be manually switched using the first switching module 412 and the second switching module 413, each of which may be embodied using an electrical switch component.

Specifically, the control module 411 may be operating in one of a learning mode and a detecting mode, and by manually operating the first switching module 412, a user is able to switch operation of the control module 411 between the learning mode and the detecting mode. Additionally, the control module 411 may be operating in one of a first arrangement mode (which corresponds with the first arrangement related to the ultrasonic radar sensor assembly 200 as shown in FIG. 2) and a second arrangement mode (which corresponds with the second arrangement related to the ultrasonic radar sensor assembly 200 as shown in FIG. 6), and by manually operating the second switching module 413, a user is able to switch operation of the control module 411 between the first arrangement mode and the second arrangement mode. It is noted that in the first arrangement mode, the alert units 421 are to be associated with the ultrasonic radar sensors 3 based on the first arrangement, and in the second arrangement, the alert units 421 are to be associated with the ultrasonic radar sensors 3 based on the second arrangement.

Referring back to FIG. 1, the alert module 42 may be in the form of an electronic device, and includes a shell 425, a vehicle icon 420 disposed on the shell 425, a plurality of alert units 421 disposed at different locations on the shell 425, a display 422 disposed on the shell 425 and an alert component 423.

The vehicle icon 420 may be in the form of an image with the shape of the back of automobile 900. The alert units 421 may be embodied using light-emitting diodes (LED) or other components that can be controlled to emit light. The alert units 421 are configured to correspond with the ultrasonic radar sensors 3, respectively, and a relation of locations between each of the alert unit 421 and the vehicle icon 420 correspond with a relative location where a corresponding one of the ultrasonic radar sensors 3 is disposed on the automobile 900. Specifically, in the embodiment of FIG. 1, six alert units 421 are present to correspond with the ultrasonic radar sensors 3, respectively, two of the alert units 421 are disposed above the vehicle icon 420 to correspond with the ultrasonic radar sensors 3A and 3B (which are disposed on the top part of the back surface 906), respectively, and four of the alert units 421 are disposed below the vehicle icon 420 to correspond with the ultrasonic radar sensors 3C, 3D, 3E and 3F (which are disposed on the bottom part of the back surface 906), respectively.

The display 422 may be embodied using a liquid crystal display (LCD), and may be controlled to display information thereon. The alert component 423 may be embodied using a buzzer or other components that are configured to generate an audio alert output, such as a buzzing sound. In some embodiments, based on a shortest distance between one of the ultrasonic radar sensors 3 and a nearby object, the buzzing sound may be generated and outputted in specific patterns (e.g., in a long buzz, a short buzz and a continuous buzz) so as to alert a driver. Typically, the control module 411 may include hardware memory components to store a number of predetermined distance thresholds to be associated with the ultrasonic radar sensors 3 (for example, each ultrasonic radar sensors 3 may be associated with three predetermined distance thresholds), and, when the shortest distance detected for a specific ultrasonic radar sensor 3 is not larger than one of the predetermined distance thresholds, a specific pattern of the buzzing sound may be generated and outputted (e.g., in a long buzz, short buzz or a continuous buzz). In some embodiments, the control module 411 stores only one predetermined distance threshold to be associated with the ultrasonic radar sensors 3.

In use, after the attached structure 908 is attached to the automobile 900, a personnel may operate the alert module 42 to initiate a setup process. Firstly, the personnel may operate the second switching module 413 to switch the control module 411 between the first arrangement mode and the second arrangement mode, based on whether the automobile 900 is a left-hand drive vehicle (where the wires 43 are in the first arrangement as shown in FIG. 2) or a right-hand driving vehicle (where the wires 43 are in the second arrangement as shown in FIG. 6).

Figure 7:
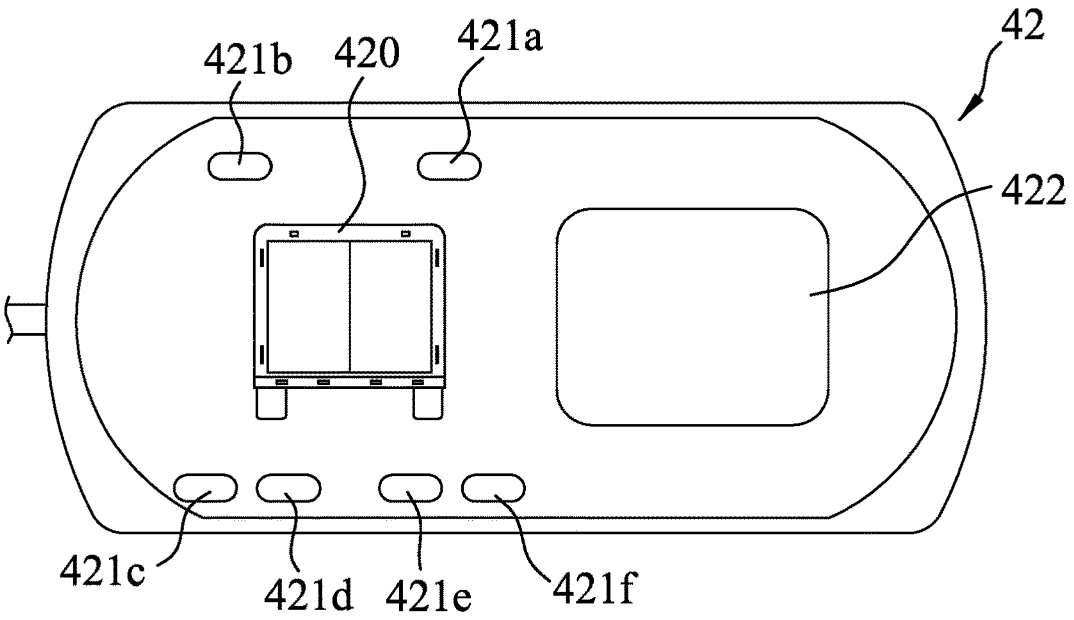
FIG. 7 illustrates an exemplary manner in which the alert units are associated with the ultrasonic radar sensors in a first arrangement mode.
Figure 8:
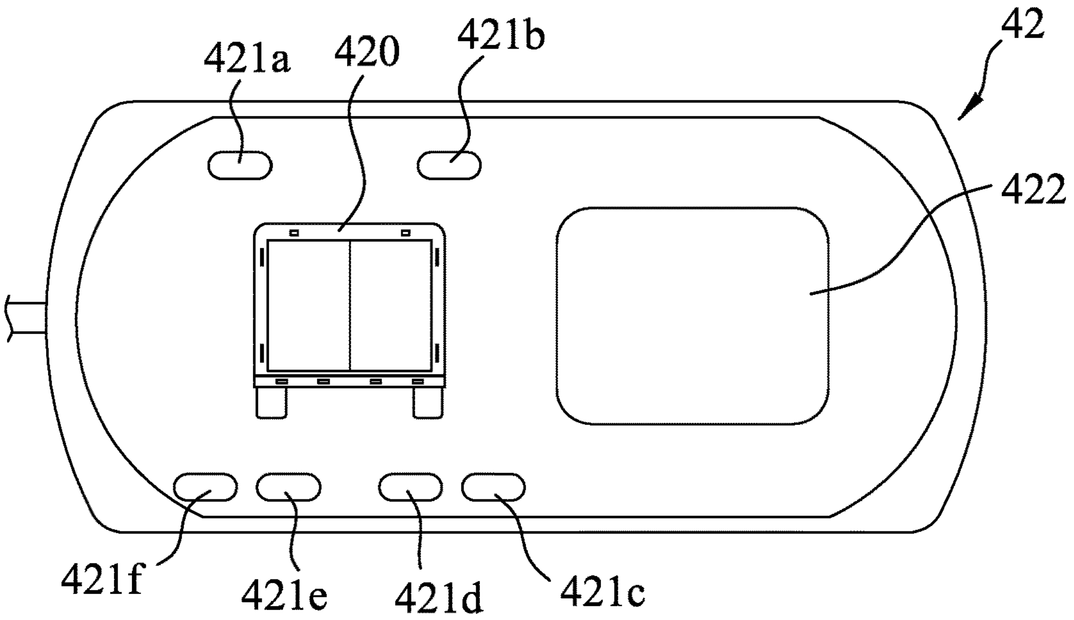
FIG. 8 illustrates an exemplary manner in which the alert units are associated with the ultrasonic radar sensors in a second arrangement mode.

Upon being switched to the first arrangement mode, the control module 411 is configured to associate the alert units 421 with the ultrasonic radar sensors 3 in a manner as shown in FIG. 7. Specifically, the two alert units 421 disposed above the vehicle icon 420 (labeled as 421*a* and 421*b*) correspond with the ultrasonic radar sensors 3A and 3B, respectively, and the four alert units 421 disposed below the vehicle icon 420 (labeled as 421*c*, 421*d*, 421*e* and 421*f*) correspond with the ultrasonic radar sensors 3C, 3D, 3E and 3F, respectively. On the other hand, upon being switched to the second arrangement mode, the control module 411 is configured to associate the alert units 421 with the ultrasonic radar sensors 3 in a manner as shown in FIG. 8.

Then, the personnel may operate the first switching module 412 to switch the control module 411 to the learning mode. In the learning mode, the automobile 900 may be parked in an open space with no objects around it. Upon being switched to the learning mode, for each of the ultrasonic radar sensors 3, the control module 411 controls the ultrasonic radar sensor 3 to emit an ultrasonic wave in the direction along the normal line (N) of the corresponding detecting surface 342. As such, each of the ultrasonic radar sensors 3 obtains a response wave signal which results from a reflection of the ultrasonic wave by the nearby object (e.g., the attached structure 908). That is to say, for each of the ultrasonic radar sensors 3, the response wave signal may indicate a number of detected distances between the ultrasonic radar sensor 3 and different parts of the attached structure 908. The control module 411 then respectively receives the response wave signals from the ultrasonic radar sensors 3 via the wires 43, and determines, for each of the ultrasonic radar sensors 3, the detected distances between the attached structure 908 and the different parts of the ultrasonic radar sensor 3. Then, for each of the ultrasonic radar sensors 3, the control module 411 determines a fixed distance range based on the detected distances indicated by the corresponding response wave signal. That is to say, the fixed distance range may be between a shortest one of the detected distances and a longest one of the detected distances. Then, the control module 411 may store the fixed distance range for each of the ultrasonic radar sensors 3, and the operation of the learning mode are completed.

Then, while the automobile 900 is in motion, the personnel may operate the first switching module 412 to switch the control module 411 to the detecting mode. Upon being switched to the detecting mode, the control module 411 is configured to activate the ultrasonic radar sensors 3, so as to emit the ultrasonic wave to detect the objects nearby.

While activated, the ultrasonic radar sensors 3 are presumptively going to detect the different parts of the attached structure 908 at all times. As such, in conventional cases, the response wave signals from some of the ultrasonic radar sensors 3 may indicate that a distance between an object and the automobile 900 is within the predetermined distance threshold, and therefore the audio alert may be continuously outputted. It is noted that in this embodiment, for the sake of simplicity of description, only one predetermined distance threshold is stored in the control module 411, but in other embodiments, additional predetermined distance thresholds may be employed.

In embodiments, in response to receipt of the response wave signals from the ultrasonic radar sensors 3, the control module 411 is configured to, for each of the ultrasonic radar sensors 3, determine a number of detected distances based on the corresponding one of response wave signals, and perform a filtering operation to filter out the detected distances that are within the fixed distance range. That is to say, the detected distances that are within the fixed distance range may be considered a result of the attached structure 908 and disregarded.

Then, for each of the ultrasonic radar sensors 3, the control module 411 determines each of the detected distances that are not within the fixed distance range as an effective detected distance. Afterward, when it is determined that, at least one effective detected distance indicated by the response wave signal obtained from at least one of the ultrasonic radar sensors (e.g., the ultrasonic radar sensor 3F) is within the predetermined distance threshold, the control module 411 controls one of the alert units 421 (e.g., the alert unit 421*f*) that corresponds with the at least one of the ultrasonic radar sensors 3 to emit light, so as to alert the driver, and controls the alert component 423 to output the audio alert. In embodiments, in the case that one of the effective detected distances from one of the ultrasonic radar sensors 3 is not larger than the predetermined distance threshold, the controller 4 controls a corresponding one of the alert units 421 to output the alert.

In the case that more than one effective detected distance that is within the predetermined distance threshold (e.g., the effective detected distances from the ultrasonic radar sensors 3A, 3B and 3C) is determined, the control module 411 determines a shortest one of the effective detected distances from those ultrasonic radar sensors 3, identifies one of the alert units 421 that corresponds with one of the ultrasonic radar sensors 3 that receives the response wave signal which indicates the shortest one of the effective detected distance (e.g., the ultrasonic radar sensors 3A), controls the one of the alert units 421 that corresponds with the one of the ultrasonic radar sensors 3 (e.g., the alert units 421*a*) to emit light, so as to alert the driver, and controls the alert component 423 to output the audio alert.

Alternatively, in some embodiments, the control module 411 may identify all of the alert units 421 whose corresponding ultrasonic radar sensors 3 each receive the response wave signal indicating at least one effective detected distance that is within the predetermined distance threshold (e.g., the alert units 421*a*, 421*b* and 421*c*), and control those alert units 421 to emit light. In some embodiments, the control module 411 may identify a preset number (e.g., two) of the alert units 421 whose corresponding ultrasonic radar sensors 3 receive the response wave signals indicating effective detected distances that are within the predetermined distance threshold and that are the shortest effective detected distances (e.g., the alert units 421*a* and 421*c*), and control those alert units 421 to emit light.

It is noted that in all cases, the control module 411 controls the display 422 to display, for each of the ultrasonic radar sensors 3, a shortest one of the effective detected distances. In other embodiment, the control module 411 may control the display 422 to display additional information.

Afterward, as the automobile 900 continues moving and the response wave signals from the ultrasonic radar sensors 3 change, information regarding distances thus detected is updated and shown on the display 422, and different ones of the ultrasonic radar sensors 3 may be controlled to emit light. In some embodiments, a manner in which the audio alert outputted by the alert component 423 may be changed based on a relationship between the shortest one of the effective detected distance from all the ultrasonic radar sensors 3 and the predetermined distance threshold. For example, when the shortest one of the effective detected distance becomes smaller than the predetermined distance threshold by another value, the buzzing sound of the audio alert may be outputted in shorter durations and in quick succession, so as to alert the driver.

In the above manner, the driver may be notified of nearby obstacles that are present with respect to each of the ultrasonic radar sensors 3 during the drive, even with the attached structure 908 installed near the ultrasonic radar sensors 3.

In some embodiments, the alert module 42 is disposed in the truck chassis 901, the ultrasonic radar sensors 3 are disposed on the container 902, the control module 411 is disposed on the container 902, and the first switching module 412 and the second switching module 413 are disposed in the truck chassis 901.

While in the embodiment of FIG. 1, the controller 41 and the alert module 42 are connected using a wire 43, in other embodiments, the controller 41 may be connected to the alert module 42 via a wireless connection (e.g., via a Bluetooth® connection). In some embodiments, the controller 41 and the alert module 42 may be integrated in one single device and disposed near the driver's seat.

In some embodiments, each of the first switching module 412 and the second switching module 413 may be disposed on one of the controller 41 and the alert module 42. In the case that the first switching module 412 and the second switching module 413 are disposed on the alert module 42, the switching between different modes may be done by the driver in a more convenient manner.

In some embodiments, each of the first switching module 412 and the second switching module 413 may be embodied using a virtual touch button displayed on the display 422.

In some embodiments, in addition to the back surface 906, additional ultrasonic radar sensors 3 may be disposed on an outer surface of the first side wall 903 and/or an outer surface of the second side wall 904.

In some embodiments, different numbers of ultrasonic radar sensors 3 may be employed. In one embodiment, one ultrasonic radar sensor 3 is present on the back wall 905, and as a result, the operations of the control unit 4 may be done with respect to the one ultrasonic radar sensor 3. Furthermore, the number of alert units 421 may be customized based on different needs; in some embodiments, the alert unit 421 may be omitted.

To sum up, embodiments of the disclosure provide an ultrasonic radar sensor assembly 200 for detecting obstacles. The ultrasonic radar sensor assembly 200 includes a plurality of ultrasonic radar sensors 3 disposed on an automobile 900, and a control unit 4 that are connected to the plurality of ultrasonic radar sensors 3. The control unit 4 may be switched between one of a learning mode and a detecting mode. When operating in the learning mode, each of the ultrasonic radar sensors 3 is activated to detect a number of detected distances. Based on the number of detected distances, the control module 411 determines a fixed distance range for each of the number of detected distances. Then, when operating in the detecting mode while the automobile 900 is in motion, the control module 411, in response to receipt of the response wave signal from each of the ultrasonic radar sensors 3, performs a filtering operation to filter out the detected distances that are within the fixed distance range. Then, the control module 411 determines each of the detected distances that are not within the fixed distance range as an effective detected distance. Based on the effective detected distance and a predetermined distance threshold, the control module 411 determines whether to generate an alert to notify the driver of an obstacle being too close. In embodiments, the control module 411 may be switched between a first arrangement mode and a second arrangement mode, so as to be used on different automobile 900 that is either a left-hand driving automobile or a right-hand driving automobile.

As such, the automobile 900 that is equipped with the ultrasonic radar sensor assembly 200 may enable a driver to be easily aware of nearby obstacles. Additionally, the ultrasonic radar sensor assembly 200 is configured to filter out the detected distances that are considered to be due to the presence of the attached structure 908. As a result, the potential issue of the ultrasonic radar sensor assembly 200 unnecessarily generating an alert due to the presence of the attached structure 908 may be eliminated.

According to one embodiment of the disclosure, there is provided a method for operating an ultrasonic radar sensor assembly 200 for detecting obstacles. The ultrasonic radar sensor assembly 200 is installed on an automobile that includes an attached structure 908, and includes a plurality of ultrasonic radar sensors 3 and a control unit 4 that is connected to the plurality of ultrasonic radar sensors 3.

The method includes: in receipt of user-operation to switch the control unit 4 to a learning mode, activating, by the control unit 4, each of the plurality of ultrasonic radar sensors 3; receiving, from each of the plurality of ultrasonic radar sensors 3, a response wave signal that results from reflection by a nearby object and that indicates a plurality of detected distances; determining, for each of the plurality of ultrasonic radar sensors 3, a fixed distance range based on the response wave signal; in receipt of user-operation to switch the control unit 4 to a detecting mode, activating, by the control unit 4, each of the plurality of ultrasonic radar sensors 3; receiving, from each of the plurality of ultrasonic radar sensors 3, the response wave signal; performing, for each of the plurality of ultrasonic radar sensors 3, a filtering operation to filter out the detected distances that are within the associated fixed distance range; determining, for each of the plurality of ultrasonic radar sensors 3, each of the detected distances that are not within the fixed distance range as an effective detected distance; based on the effective detected distance and a predetermined distance threshold, determining whether to generate and output an alert. For example, in the case that one of the effective detected distances is not larger than the predetermined distance threshold, the control unit 4 generates and outputs an alert.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An ultrasonic radar sensor assembly for detecting obstacles, being installed on an automobile that includes an attached structure, the automobile including a container that has a first side wall, a second side wall that is opposite to the first side wall, and a back wall that defines a back surface, the ultrasonic radar sensor assembly comprising:

an ultrasonic radar sensor that is disposed on a surface of the automobile, the ultrasonic radar sensor, when activated, being configured to emit an ultrasonic wave, and to obtain a response wave signal that results from a reflection of the ultrasonic wave by a nearby object and that indicates a plurality of detected distances; and a control unit that is connected to the ultrasonic radar sensor, and that includes a controller and an alert module, the controller being configured to operate in one of a learning mode and a detecting mode, wherein:

when operating in the learning mode, the controller activates the ultrasonic radar sensor, receives the response wave signal, and determines a fixed distance range based on the response wave signal;

when operating in the detecting mode, the controller activates the ultrasonic radar sensor, receives the response wave signal, performs a filtering operation to filter out the detected distances that are within the fixed distance range, determines each of the detected distances that are not within the fixed distance range as an effective detected distance, and in the case that the effective detected distance is not larger than a predetermined distance threshold, generates an alert and controls the alert module to output the alert;

the ultrasonic radar sensor assembly comprising a plurality of ultrasonic radar sensors disposed on the surface of the automobile, wherein:

the control unit further includes a plurality of alert units that correspond with the ultrasonic radar sensors, respectively;

when operating in the learning mode, the controller activates each of the ultrasonic radar sensors, respectively receives the response wave signals from the ultrasonic radar sensors, and determines a fixed distance range for each of the ultrasonic radar sensors based on the corresponding response wave signal;

when operating in the detecting mode, the controller activates each of the ultrasonic radar sensors, respectively receives the response wave signals from the ultrasonic radar sensors, performs, for each of the ultrasonic radar sensors, a filtering operation to filter out the detected distances that are within the fixed distance range determined for the ultrasonic radar sensor, determines, for each of the ultrasonic radar sensors, each of the detected distances that are not within the fixed distance range as an effective detected distance, and in the case that one of the effective detected distances determined for the ultrasonic radar sensors is not larger than the predetermined distance threshold, generates the alert and controls the alert module to output the alert;

wherein:

the control unit further includes a plurality of wires having different lengths for connecting the controller and the ultrasonic radar sensors, and;

the ultrasonic radar sensor assembly is arranged in one of a first arrangement, in which the wires extend across the first side wall and the back surface, and a second arrangement, in which the wires extend across the second side wall and the back surface;

the alert module further includes a shell, a vehicle icon disposed on the shell and a display disposed on the shell, the alert units are disposed at different locations on the shell, and a relation of locations between each of the alert units and the vehicle icon correspond with a relative location where a corresponding one of the ultrasonic radar sensors is disposed on the automobile;

the controller is operable in one of a first arrangement mode, in which the alert units are associated with the ultrasonic radar sensors based on the first arrangement, and a second arrangement mode, in which the alert units are associated with the ultrasonic radar sensors based on the second arrangement; and in the case that one of the effective detected distances from one of the ultrasonic radar sensors is not larger than the predetermined distance threshold, the controller controls a corresponding one of the alert units to output the alert.

2. The ultrasonic radar sensor assembly as claimed in claim 1, wherein:

the controller includes a control module, a first switching module connected to the control module, and a second switching module connected to the control module;

the first switching module is enabled to be manually operated to switch the control module to operate between the learning mode and the detecting mode; and the second switching module is enabled to be manually operated to switch the control module to operate between the first arrangement mode and the second arrangement mode.

3. The ultrasonic radar sensor assembly as claimed in claim 2, the automobile further including a truck chassis connected to the container, wherein the alert module is disposed on the truck chassis, the ultrasonic radar sensors are disposed on the container, the control module is disposed on the container, and the first switching module and the second switching module are disposed on the truck chassis.

4. The ultrasonic radar sensor assembly as claimed in claim 3, wherein the controller and the alert module are connected using a wire.

5. The ultrasonic radar sensor assembly as claimed in claim 3, wherein the controller is connected to the alert module via a wireless connection.

6. The ultrasonic radar sensor assembly as claimed in claim 1, wherein, in a case that more than one of the effective detected distances that are within the predetermined distance threshold is determined, the controller:

determines a shortest one of the effective detected distances from all the ultrasonic radar sensors;

identifies one of the alert units that corresponds with the one of the ultrasonic radar sensors that receives the response wave signal which indicates the shortest one of the effective detected distance; and controls the one of the alert units that corresponds with the one of the ultrasonic radar sensors to output the alert.

7. The ultrasonic radar sensor assembly as claimed in claim 6, wherein the alert module further includes a display that is controlled to display, for each of the ultrasonic radar sensors, a shortest one of the effective detected distances.

8. The ultrasonic radar sensor assembly as claimed in claim 1, the container having a back wall disposed to be in a vertically standing position with respect to the ground, and being formed with a plurality of through holes that are spaced apart from one another, wherein:

each of the ultrasonic radar sensors is installed on the back wall through a respective one of the through holes, and includes a first angled securing member, a second angled securing member, a gasket, a main body and a securing nut, and the main body includes a sensor head portion that defines a detecting surface, and a securing portion;

the first angled securing member and the gasket are disposed on one side of the back wall, and the second angled securing member is disposed on an opposite side of the back wall, the gasket and the second angled securing member are disposed to contact the back wall directly, and the first angled securing member are disposed to contact the gasket;

the securing portion is formed to be able to be moved through the first angled securing member, the gasket, the through hole and the second angled securing member, and the securing nut sleeves the securing portion and contacts the second angled securing member;

the first angled securing member and the second angled securing member are formed to have shapes that a normal line of the detecting surface defines an angle with a horizontal line, the angle being between 5 to 15 degrees.

* * * * *